United States Patent
Handy et al.

(10) Patent No.: US 12,136,179 B2
(45) Date of Patent: Nov. 5, 2024

(54) STYLE TRANSFER PROGRAM AND STYLE TRANSFER METHOD

(71) Applicant: SQUARE ENIX CO., LTD., Tokyo (JP)

(72) Inventors: Edgar Handy, Tokyo (JP); Youichiro Miyake, Tokyo (JP); Shinpei Sakata, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 209 days.

(21) Appl. No.: 17/731,148

(22) Filed: Apr. 27, 2022

(65) Prior Publication Data
US 2022/0351479 A1 Nov. 3, 2022

(30) Foreign Application Priority Data
Apr. 29, 2021 (JP) ................ 2021-076919

(51) Int. Cl.
*G06T 11/00* (2006.01)
*G06N 3/08* (2023.01)
*G06T 15/06* (2011.01)
*G06T 17/00* (2006.01)
*G06T 19/20* (2011.01)

(52) U.S. Cl.
CPC ............ *G06T 19/20* (2013.01); *G06N 3/08* (2013.01); *G06T 11/001* (2013.01); *G06T 15/06* (2013.01); *G06T 17/00* (2013.01); *G06T 2219/2024* (2013.01)

(58) Field of Classification Search
CPC ............................ G06T 19/20; G06T 11/001
See application file for complete search history.

(56) References Cited

U.S. PATENT DOCUMENTS 11,637,998 B1 * 4/2023 Pieper .................... H04N 23/85
348/207.99
2018/0068463 A1 * 3/2018 Risser ...................... G06T 7/45

FOREIGN PATENT DOCUMENTS

JP 2020187583 A 11/2020

OTHER PUBLICATIONS

Gatys et al., "Image Style Transfer Using Convolutional Neural Networks," 2016 IEEE Conference on Computer Vision and Pattern Recognition (CVPR), Las Vegas, NV, USA, 2016, pp. 2414-2423.*
Vincent Dumoulin et al. "A Learned Representation for Artistic Style", Google Brain, Mountain View, CA; published as a conference paper at ICLR 2017; Feb. 9, 2017; pp. all.

* cited by examiner

*Primary Examiner* — Matthew Salvucci
(74) *Attorney, Agent, or Firm* — Dorsey & Whitney LLP

(57) ABSTRACT

A style transfer program causes a server to implement an acquisition function of acquiring buffer data from a buffer used for rendering, a style transfer function of applying style transfer based on one or more style images to the buffer data, and an output function of outputting data after the style transfer is applied.

4 Claims, 16 Drawing Sheets

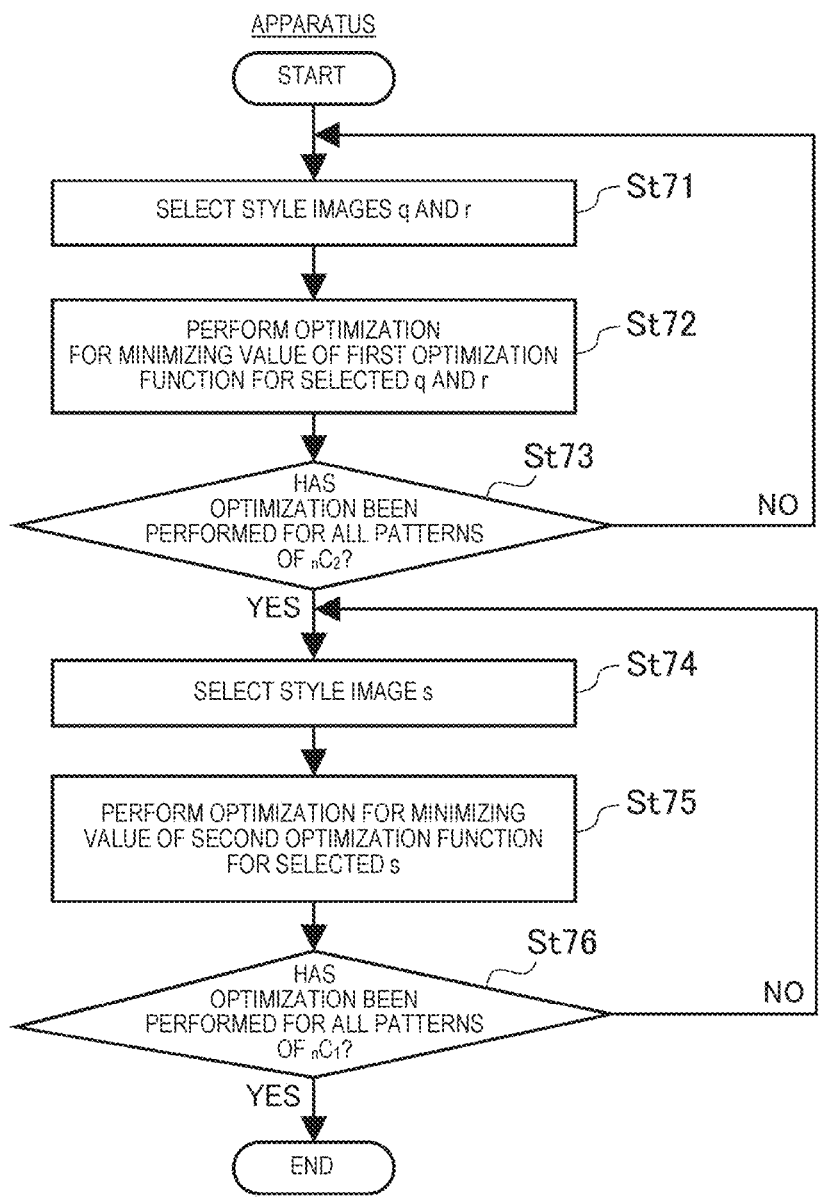

STYLE TRANSFER PROGRAM AND STYLE TRANSFER METHOD

CROSS REFERENCE TO RELATED APPLICATION(S)

This application claims priority to and the benefit of Japanese Patent Application No. JP2021-076919, filed on Apr. 29, 2022 the disclosure of which is expressly incorporated herein by reference in its entirety for any purpose.

BACKGROUND

At least one embodiment of the present invention relates to a non-transitory computer readable medium including a style transfer program, and a style transfer method.

A technology of style transfer for transforming a photo image into an image corresponding to a predetermined style such as Gogh style or Monet style is known. Examples of such style transformation (style transfer) may be disclosed in Japanese Patent Application Publication 2020-187583 A1.

SUMMARY

A plurality of buffers used for rendering images are present in a video game or the like. In a case where the style transformation can be performed in units of buffers, representational power of an image provided to a user is increased.

An object of at least one embodiment of the present disclosure is to solve the above problem and increase representational power of an image provided to a user.

From a non-limiting viewpoint, a non-transitory computer readable medium including a style transfer program according to one embodiment of the present disclosure causes a server to implement an acquisition function of acquiring buffer data from a buffer used for rendering, a style transfer function of applying style transfer based on one or more style images to the buffer data, and an output function of outputting data after the style transfer is applied.

From a non-limiting viewpoint, a style transfer method according to one embodiment of the present disclosure is a style transfer method by a computer and includes an acquisition process of acquiring buffer data from a buffer used for rendering, a style transfer process of applying style transfer based on one or more style images to the buffer data, and an output process of outputting data after the style transfer is applied.

Each embodiment of the present application solves one or two or more deficiencies.

BRIEF DESCRIPTION OF THE DRAWINGS

FIG. 16 is a flowchart illustrating a process example of an optimization process according to at least one embodiment of the present disclosure.

DESCRIPTION OF EMBODIMENTS

Hereinafter, an example of embodiments of the present disclosure will be described with reference to the drawings. Various constituents in the example of each embodiment described below can be appropriately combined without contradiction or the like. In addition, contents described as an example of a certain embodiment may not be described in other embodiments. In addition, contents of operations or processes not related to a characteristic part of each embodiment may be omitted. Furthermore, an order of various processes constituting various flows or sequences described below may be changed without contradiction or the like in process contents.

First Embodiment

A summary of a first embodiment of the present disclosure will be described. Hereinafter, a style transfer program executed in a server will be illustratively described as the first embodiment.

Figure 1:
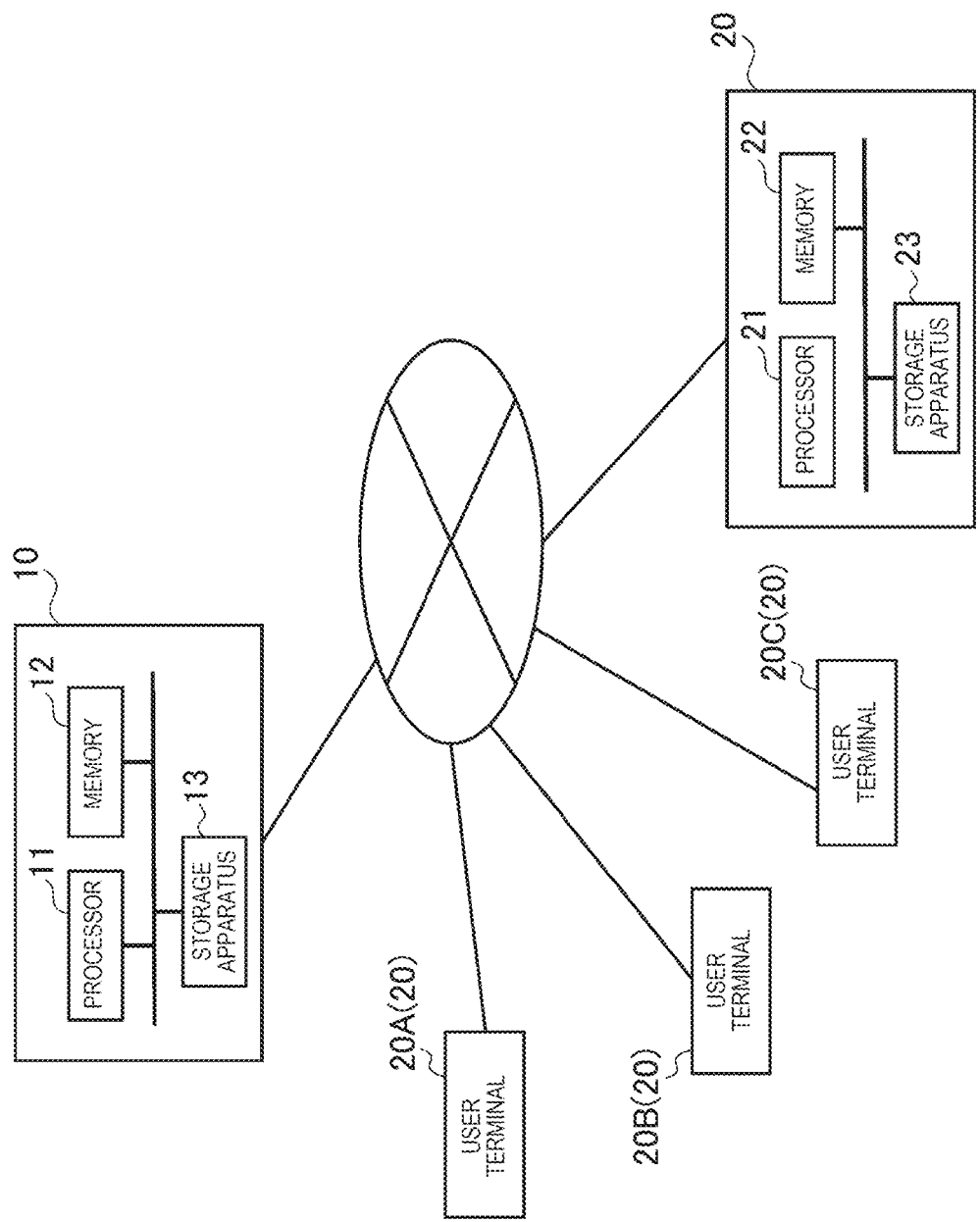
FIG. 1 is a block diagram illustrating an example of a configuration of a video game processing system according to at least one embodiment of the present disclosure.

FIG. 1 is a block diagram illustrating an example of a configuration of a video game processing system according to at least one embodiment of the present disclosure. A video game processing system 100 includes a video game processing server 10 (server 10) and a user terminal 20 used by a user (player or the like of a game) of the video game processing system 100. Each of user terminals 20A, 20B, and 20C is an example of the user terminal 20. The configuration of the video game processing system 100 is not limited thereto. For example, the video game processing system 100 may have a configuration in which a plurality of users use a single user terminal. The video game processing system 100 may include a plurality of servers.

Each of the server 10 and the user terminal 20 is communicably connected to a communication network 30 such as the Internet. Connection between the communication network 30 and the server 10 and connection between the communication network 30 and the user terminal 20 may be wired connection or wireless connection. For example, the user terminal 20 may be connected to the communication network 30 by performing data communication with a base station managed by a communication service provider using a wireless communication line.

The video game processing system 100, by including the server 10 and the user terminal 20, implements various functions for executing various processes in accordance with an operation of the user.

The server 10 controls progress of the video game. The server 10 is managed by a manager of the video game processing system 100 and has various functions for providing information related to various processes to a plurality of user terminals 20.

The server 10 includes a processor 11, a memory 12, and a storage apparatus 13. For example, the processor 11 is a central processing apparatus such as a central processing unit (CPU) that performs various calculations and controls. In addition, in a case where the server 10 includes a graphics processing unit (GPU), the GPU may perform a part of the various calculations and controls. The server 10 executes various information processes by the processor 11 using data read into the memory 12 and stores obtained process results in the storage apparatus 13 as needed.

The storage apparatus 13 has a function as a storage medium storing various information. A configuration of the storage apparatus 13 is not particularly limited but is preferably a configuration capable of storing all of various information necessary for controls performed in the video game processing system 100 from a viewpoint of reducing a process load exerted on the user terminal 20. Such examples include an HDD and an SSD. However; the storage apparatus storing various information may have a storage region in an accessible state from the server 10 and, for example, may be configured to have a dedicated storage region outside the server 10. The server 10 is managed by the manager or the like of the video game processing system 100 and has various functions for providing information related to various processes to the plurality of user terminals 20. The server 10 is configured with an information processing apparatus such as a game server that can render a game image.

The user terminal 20 is managed by the user and is configured with a communication terminal capable of performing a network distribution type game. Examples of the communication terminal capable of performing the network distribution type game include a mobile phone terminal, a personal digital assistant (PDA), a portable game apparatus, VR goggles, AR glasses, smart glasses, and a so-called wearable apparatus. The configuration of the user terminal that may be included in the video game processing system 100 is not limited thereto and may be a configuration in which the user may recognize a combined image. Other examples of the configuration of the user terminal include a combination of various communication terminals, a personal computer, and a stationary game apparatus.

The user terminal 20 is connected to the communication network 30 and includes hardware (for example, a display apparatus that displays a browser screen corresponding to coordinates or a game screen) and software for executing various processes by communicating with the server 10. Each of the plurality of user terminals 20 may be configured to be capable of directly communicating with each other without the server 10.

The user terminal 20 may incorporate a display apparatus. In addition, the display apparatus may be connected to the user terminal 20 in a wireless or wired manner. The display apparatus is a very general configuration and thus, will not be illustrated here. For example, the game screen is displayed by the display apparatus as the combined image, and the user recognizes the combined image. For example, the game screen is displayed on a display that is an example of the display apparatus included in the user terminal, or a display that is an example of the display apparatus connected to the user terminal. Examples of the display apparatus include a hologram display apparatus that can perform hologram display, and a projection apparatus that projects images (including the game screen) to a screen or the like.

The user terminal 20 includes a processor 21, a memory 22, and a storage apparatus 23. For example, the processor 21 is a central processing apparatus such as a central processing unit (CPU) that performs various calculations and controls. In addition, in a case where the user terminal 20 includes a graphics processing unit (GPU), the GPU may perform a part of the various calculations and controls. The user terminal 20 executes various information processes by the processor 21 using data read into the memory 22 and stores obtained process results in the storage apparatus 23 as needed. The storage apparatus 23 has a function as a storage medium storing various information.

The user terminal 20 may incorporate an input apparatus. In addition, the input apparatus may be connected to the user terminal 20 in a wireless or wired manner. The input apparatus receives an operation input provided by the user. The processor included in the server 10 or the processor included in the user terminal 20 executes various control processes in accordance with the operation input provided by the user. Examples of the input apparatus include a touch panel screen included in a mobile phone terminal or a controller connected to AR glasses in a wireless or wired manner. In addition, a camera included in the user terminal 20 may correspond to the input apparatus. The user provides the operation input (gesture input) by a gesture such as moving a hand in front of the camera.

Besides, the user terminal 20 may include another output apparatus such as a speaker. The other output apparatus outputs voice or other various information to the user.

Figure 2:
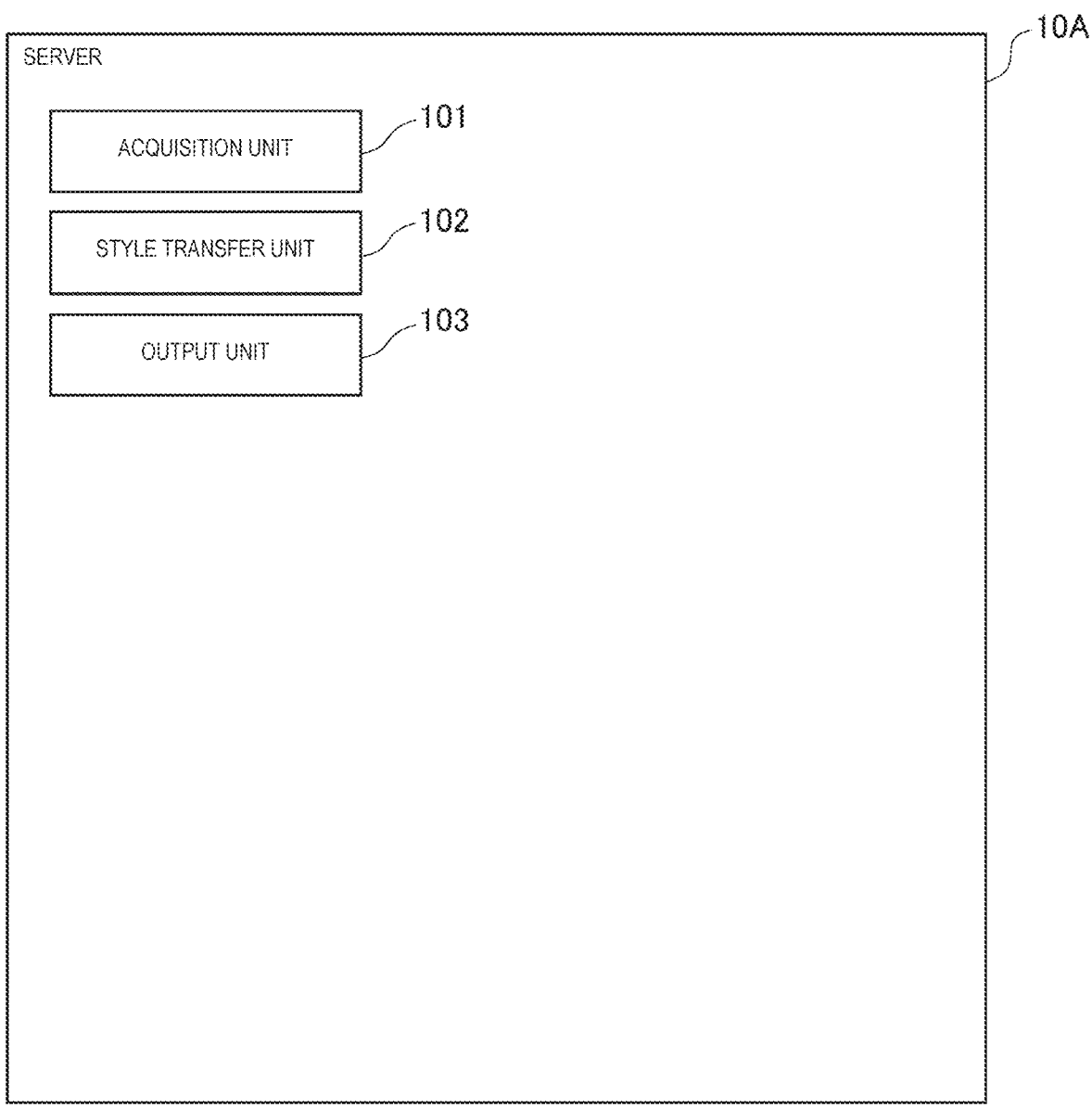
FIG. 2 is a block diagram illustrating a configuration of a server according to at least one embodiment of the present disclosure.

FIG. 2 is a block diagram illustrating a configuration of the server according to at least one embodiment of the present disclosure. A server 10A that is an example of the configuration of the server 10 includes at least an acquisition unit 101, a style transfer unit 102, and an output unit 103. The processor included in the server 10A functionally implements the acquisition unit 101, the style transfer unit 102, and the output unit 103 by referring to the style transfer program held in the storage apparatus and executing the program.

The acquisition unit 101 has a function of acquiring buffer data from a buffer used for rendering. The style transfer unit 102 has a function of applying the style transfer based on one or more style images to the buffer data. The output unit 103 has a function of outputting data after the style transfer is applied.

Figure 3:
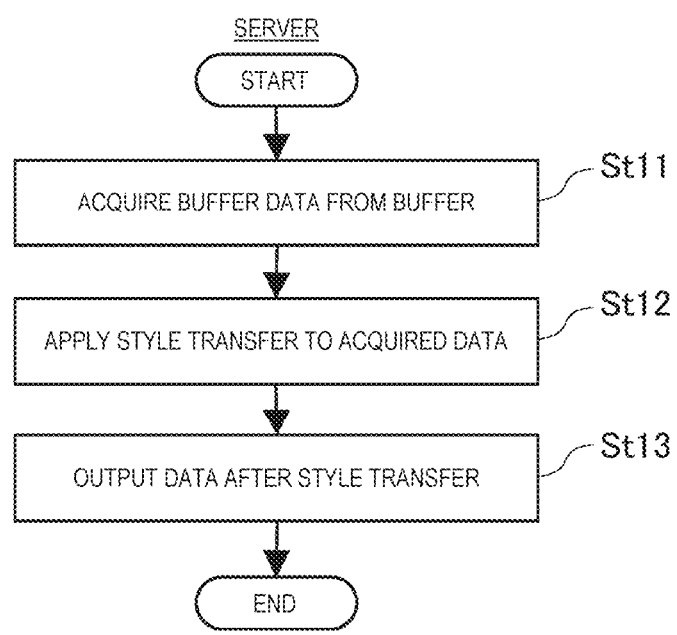
FIG. 3 is a flowchart illustrating an example of a style transfer program process according to at least one embodiment of the present disclosure.

Next, a program execution process in the first embodiment of the present disclosure will be described. FIG. 3 is a flowchart illustrating an example of a style transfer program process according to at least one embodiment of the present disclosure.

The acquisition unit 101 acquires the buffer data from the buffer used for rendering (St11). The style transfer unit 102 applies the style transfer based on one or more style images to the acquired buffer data (St12). The output unit 103 outputs the data after the style transfer is applied (St13).

A style means, for example, a mode or a type in construction, art, music, or the like. For example, the style may mean a painting style such as Gogh style or Picasso style. The style may mean a format (for example, a color, a predetermined design, or a pattern) of an image.

The buffer used for rendering means, for example, a buffer used by a rendering engine having a function of rendering a three-dimensional CG image.

The style transfer unit 102 may use a neural network for the style transfer. For example, related technologies include Vincent Dumoulin, et, al. "A LEARNED REPRESENTATION FOR ARTISTIC STYLE". An output image to which the style transfer is applied is obtained by causing the style transfer unit 102 to input an input image of a predetermined size into the neural network.

An output destination of the data after application of the style transfer for the output unit 103 may be a buffer different from the buffer from which the acquisition unit 101 acquires the buffer data. More specifically, in a case where the buffer from which the acquisition unit 101 acquires the buffer data is a first buffer, the output destination of the data after application of the style transfer may be a second buffer different from the first buffer. The second buffer may be a buffer used after the first buffer in a rendering process.

Besides, the output destination of the data after application of the style transfer for the output unit 103 may be an output apparatus included in the server 10A or an external apparatus seen from the server 10A.

As one aspect of the first embodiment, the style transfer can be applied in units of buffers used for rendering. Accordingly, representational power of an image provided to the user can be increased.

As one aspect of the first embodiment, by incorporating the acquisition unit 101, the style transfer unit 102, and the like into a game engine capable of operating the buffer, the style transfer can be performed based on richer information than data such as a photo or the like used in the related art. For example, the game engine can recognize a specific object to be displayed on the game screen and apply the style transfer to only a buffer corresponding to the specific object.

As one aspect of the first embodiment, in a case where a configuration of applying the style transfer to the buffer is used, a type of applied style transfer can be appropriately selected for each buffer. Thus, various CG representations can be performed. For example, applying the style transfer of transforming the style into Gogh style to the first buffer and applying the style transfer of transforming the style to Gauguin style to the second buffer can be newly performed.

As one aspect of the first embodiment, by applying the style transfer to the buffer used for rendering, the style of the game image can be changed in real time.

Second Embodiment

A summary of a second embodiment of the present disclosure will be described. Hereinafter, a style transfer program executed in a server will be illustratively described as the second embodiment. The server may be the server 10 included in the video game processing system 100 illustrated in FIG. 1.

Figure 4:
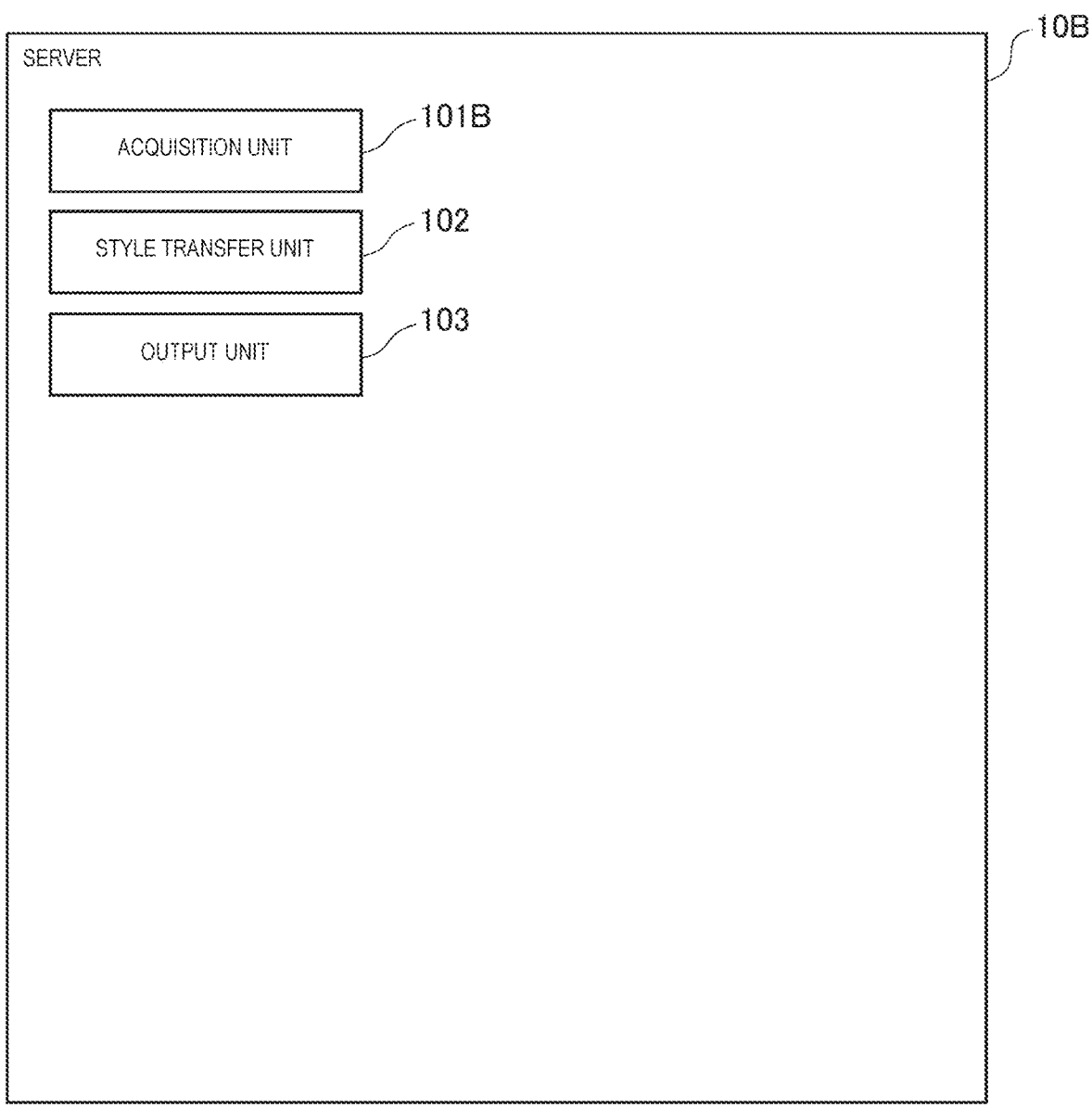
FIG. 4 is a block diagram illustrating a configuration of the server according to at least one embodiment of the present disclosure.

FIG. 4 is a block diagram illustrating a configuration of the server according to at least one embodiment of the present disclosure. A server 108 that is an example of the configuration of the server 10 includes at least an acquisition unit 101B, the style transfer unit 102, and the output unit 103. The processor included in the server 108 functionally implements the acquisition unit 101B, the style transfer unit 102, and the output unit 103 by referring to the style transfer program held in the storage apparatus and executing the program.

The acquisition unit 101B has a function of acquiring buffer data from a 3D buffer used for rendering. The style transfer unit 102 has a function of applying the style transfer based on one or more style images to the buffer data. The output unit 103 has a function of outputting data after the style transfer is applied.

Figure 5:
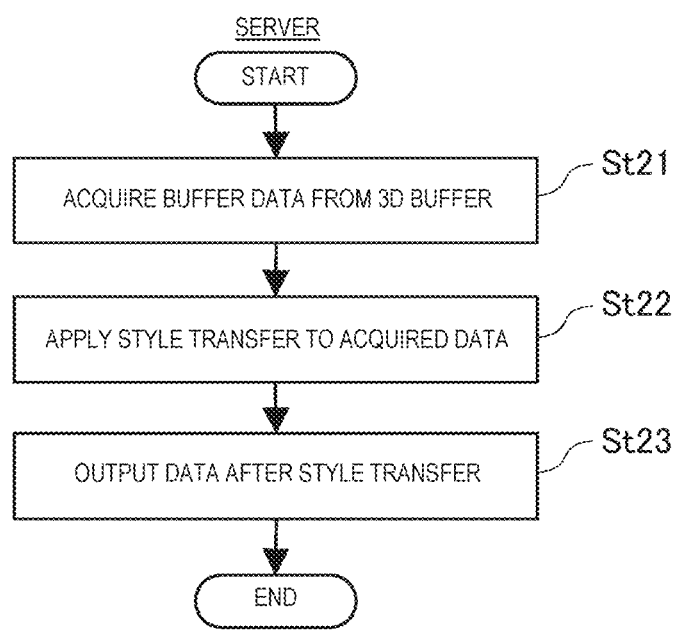
FIG. 5 is a flowchart illustrating an example of the style transfer program process according to at least one embodiment of the present disclosure.

Next, a program execution process in the second embodiment of the present disclosure will be described. FIG. 5 is a flowchart illustrating an example of the style transfer program process according to at least one embodiment of the present disclosure.

The acquisition unit 101O acquires the buffer data from the 3D buffer used for rendering (St21). The style transfer unit 102 applies the style transfer based on one or more style images to the acquired buffer data (St22). The output unit 103 outputs the data after the style transfer is applied (St23).

A style means, for example, a mode or a type in construction, art, music, or the like. For example, the style may mean a painting style such as Gogh style or Picasso style. The style may mean a format (for example, a color, a predetermined design, or a pattern) of an image.

The 3D buffer used for rendering means, for example, a buffer that stores data capable of representing a three-dimensional space.

The style transfer unit 102 and the output unit 103 are the same as in the first embodiment and thus, will not be described in detail.

As one aspect of the second embodiment, the style transfer can be applied to the 3D buffer used for rendering. Accordingly, the style of the entire 3D CG map displayed to the user can be transformed based on various conditions and the like in the game.

Third Embodiment

A summary of a third embodiment of the present disclosure will be described. Hereinafter, a style transfer program executed in a server will be illustratively described as the third embodiment.

Figure 6:
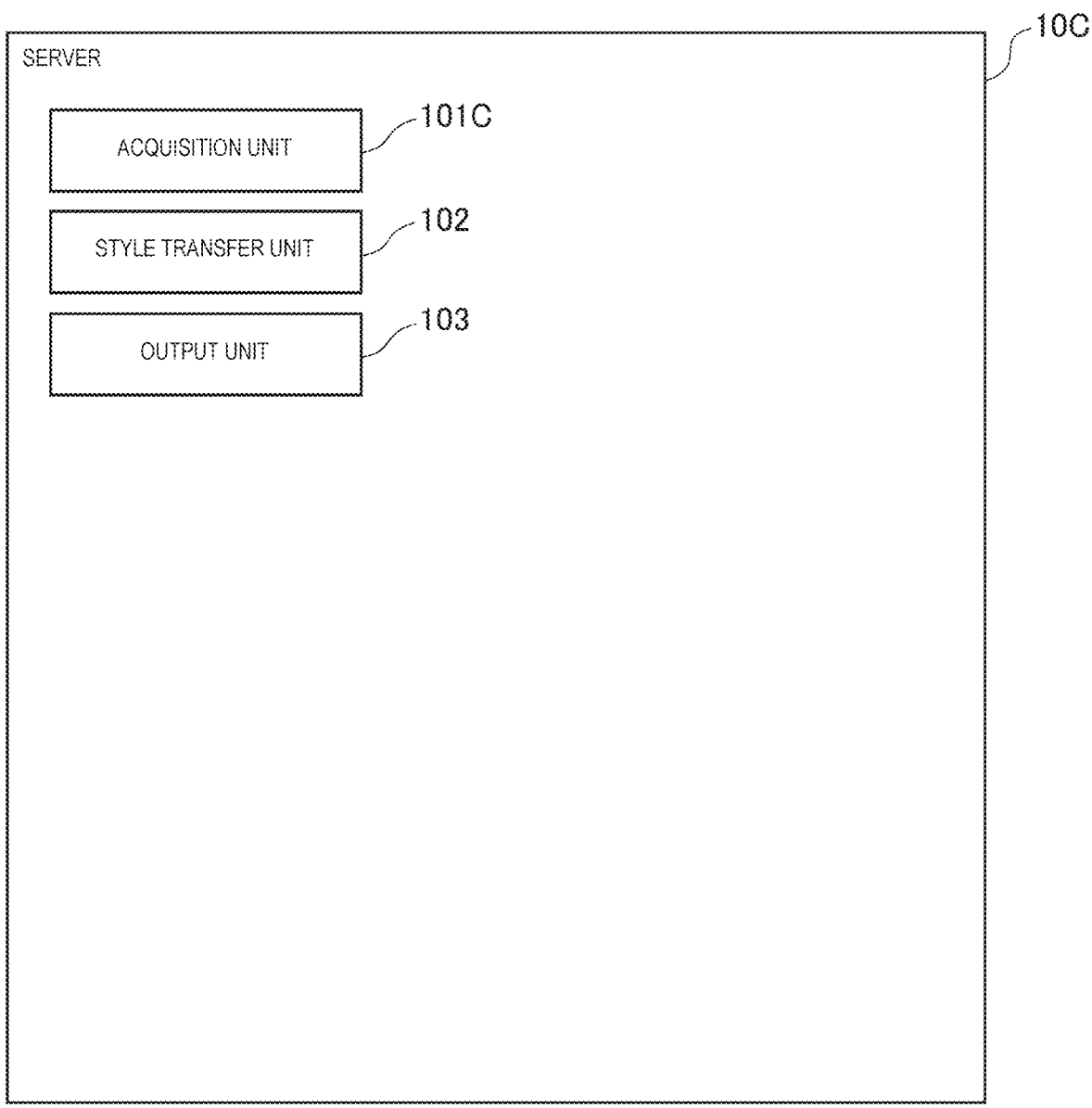
FIG. 6 is a block diagram illustrating a configuration of the server according to at least one embodiment of the present disclosure.

FIG. 6 is a block diagram illustrating a configuration of the server according to at least one embodiment of the present disclosure. A server 10C that is an example of the configuration of the server 10 includes at least an acquisition unit 101C, the style transfer unit 102, and the output unit 103. The processor included in the server 10C functionally implements the acquisition unit 101C, the style transfer unit 102, and the output unit 103 by referring to the style transfer program held in the storage apparatus and executing the program.

The acquisition unit 101O has a function of acquiring buffer data from an intermediate buffer used for rendering. The style transfer unit 102 has a function of applying the style transfer based on one or more style images to the acquired buffer data. The output unit 103 has a function of outputting data after the style transfer is applied.

Figure 7:
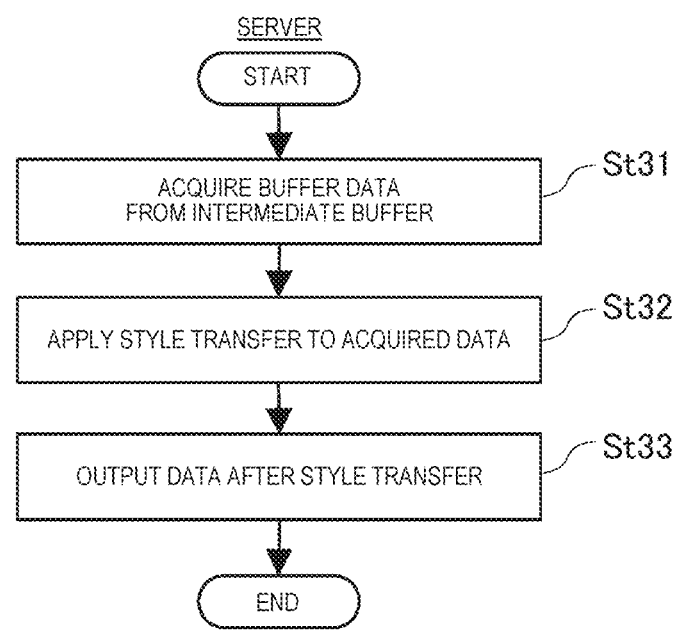
FIG. 7 is a flowchart illustrating an example of the style transfer program process according to at least one embodiment of the present disclosure.

Next, a program execution process in the third embodiment of the present disclosure will be described. FIG. 7 is a flowchart illustrating an example of the style transfer program process according to at least one embodiment of the present disclosure.

The acquisition unit 101C acquires the buffer data from the intermediate buffer used for rendering (St31). The style transfer unit 102 applies the style transfer based on one or more style images to the acquired buffer data (St32). The output unit 103 outputs the data after the style transfer is applied (St33).

A style means, for example, a mode or a type in construction, art, music, or the like. For example, the style may mean a painting style such as Gogh style or Picasso style. The style may mean a format (for example, a color, a predetermined design, or a pattern) of an image.

The intermediate buffer used for rendering is a buffer used in the middle of the rendering process. Examples of the intermediate buffer include an RGB buffer, a BaseColor buffer, a Metallic buffer, a Specular buffer, a Roughness buffer; and a Normal buffer. These buffers are buffers arranged before a final buffer in which a CG image finally output is stored, and are buffers different from the final buffer. The intermediate buffer used for rendering is not limited to the illustrated buffers.

The style transfer unit 102 and the output unit 103 are the same as in the first embodiment and thus, will not be described in detail.

As one aspect of the third embodiment, by applying the style transfer to the data stored in the intermediate buffer used for rendering, the data to which the style transfer is applied can be obtained as an output of the intermediate buffer. The style transfer can be applied to a part of data such as color information or light reflection information cut out from various viewpoints in the middle of rendering. Thus, precise style transformation or style control can be performed. In addition, by generating a final image using the data to which the style transfer is applied, representational power of the final image provided to the user can be further increased.

Fourth Embodiment

A summary of a fourth embodiment of the present disclosure will be described. Hereinafter, a style transfer program executed in a server will be illustratively described as the fourth embodiment.

Figure 8:
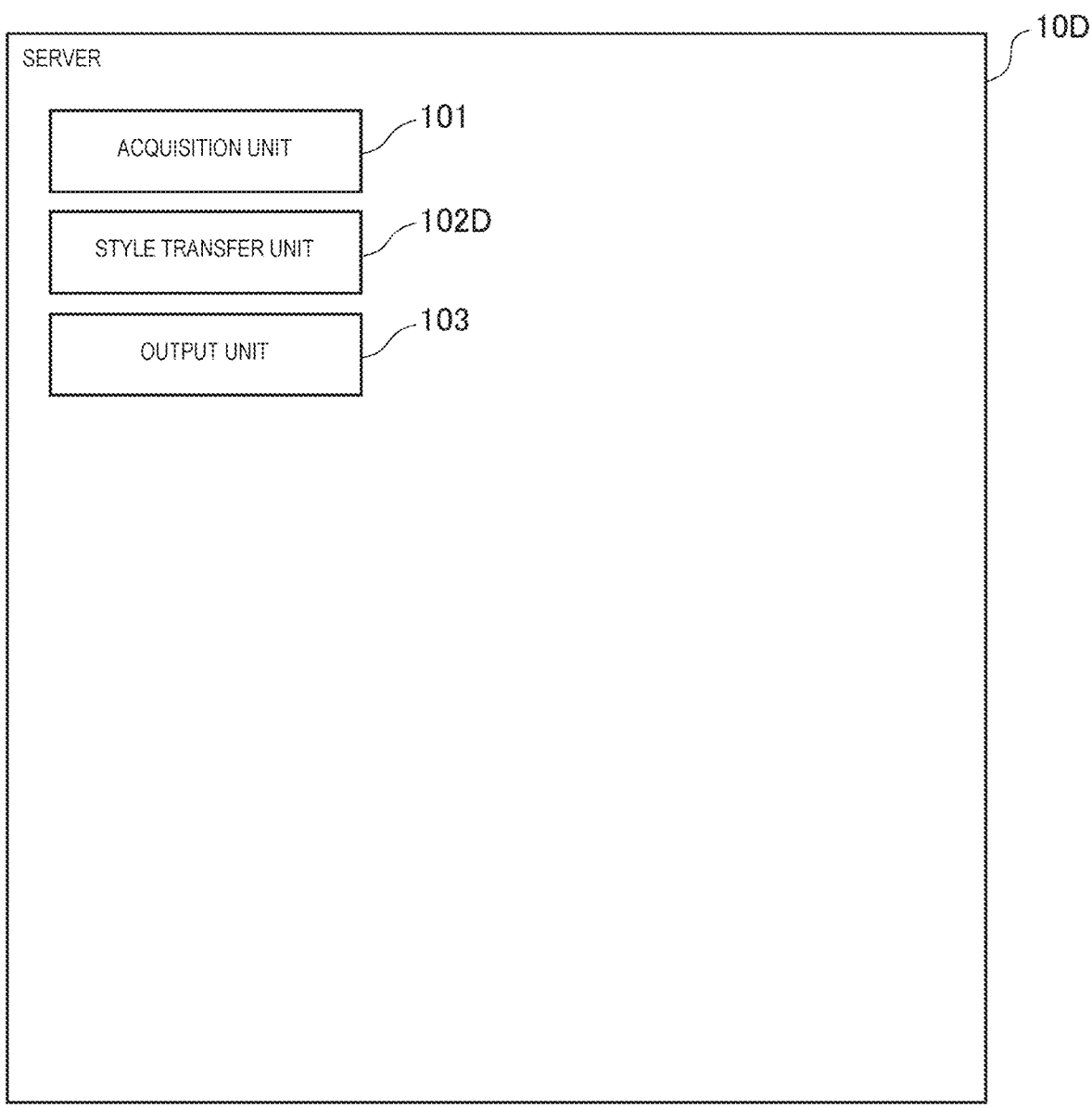
FIG. 8 is a block diagram illustrating a configuration of the server according to at least one embodiment of the present disclosure.

FIG. 8 is a block diagram illustrating a configuration of the server according to at least one embodiment of the present disclosure. A server 10D that is an example of the configuration of the server 10 includes at least the acquisition unit 101, a style transfer unit 102D, and the output unit 103. The processor included in the server 10D functionally implements the acquisition unit 101, the style transfer unit 102D, and the output unit 103 by referring to the style transfer program held in the storage apparatus and executing the program.

The acquisition unit 101 has a function of acquiring the buffer data from the buffer used for rendering. The style transfer unit 102D has a function of applying the style transfer based on a plurality of style images to the acquired buffer data. Application of the style transfer is performed by inputting the buffer data into a learned neural network that is obtained by mixing parameters based on the plurality of style images into a predetermined layer of the neural network and performing an optimization process based on an optimization function defined based on the plurality of style images. The output unit 103 has a function of outputting data after the style transfer is applied.

Figure 9:
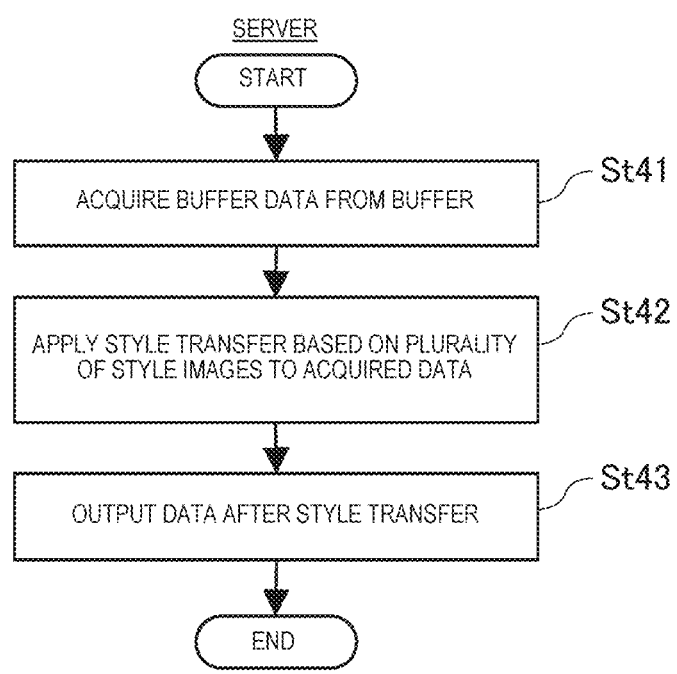
FIG. 9 is a flowchart illustrating an example of the style transfer program process according to at least one embodiment of the present disclosure.

Next, a program execution process in the fourth embodiment of the present disclosure will be described. FIG. 9 is a flowchart illustrating an example of the style transfer program process according to at least one embodiment of the present disclosure.

The acquisition unit 101 acquires the buffer data from the buffer used for rendering (St41). The style transfer unit 102D applies the style transfer based on the plurality of style images to the acquired buffer data (St42). The output unit 103 outputs the data after the style transfer is applied (St43).

A style means, for example, a mode or a type in construction, art, music, or the like. For example, the style may mean a painting style such as Gogh style or Picasso style. The style may mean a format (for example, a color, a predetermined design, or a pattern) of an image.

The buffer used for rendering may be any of the buffers described in the first to third embodiments.

The style transfer unit 102D has a function of applying the style transfer based on the plurality of style images to the acquired buffer data. The style transfer unit 102D performs the style transfer in which a plurality of styles are blended.

The style transfer unit 102D may use a neural network for the style transfer. For example, related technologies include Vincent Dumoulin, et. al. "A LEARNED REPRESENTATION FOR ARTISTIC STYLE".

In the fourth embodiments, the plurality of styles are blended and applied. In order to do so, the parameters based on the plurality of style images are mixed into the predetermined layer of the neural network at the time of learning. For example, the predetermined layer may be an affine layer (fully connected layer).

In the fourth embodiment, furthermore, the optimization process is performed on the neural network based on the optimization function defined based on the plurality of style images. By the optimization process, the learned neural network that is more appropriate for the plurality of style images is obtained.

The output image to which the style transfer is applied is obtained by causing the style transfer unit 102D to input the input image of the predetermined size into the learned neural network. In the fourth embodiment, the input image corresponds to the buffer data.

The output unit 103 is the same as in the first embodiment and thus, will not be described in detail.

As one aspect of the fourth embodiment, not only the parameters based on the plurality of style images are mixed into the predetermined layer of the neural network, but also the optimization process is performed based on the optimization function defined based on the plurality of style images. Accordingly, the style transfer in which the plurality of style images are harmoniously blended can be implemented using the learned neural network obtained by the optimization process.

Fifth Embodiment

A summary of a fifth embodiment of the present disclosure will be described, Hereinafter, a style transfer program executed in a server will be illustratively described as the fifth embodiment.

Figure 10:
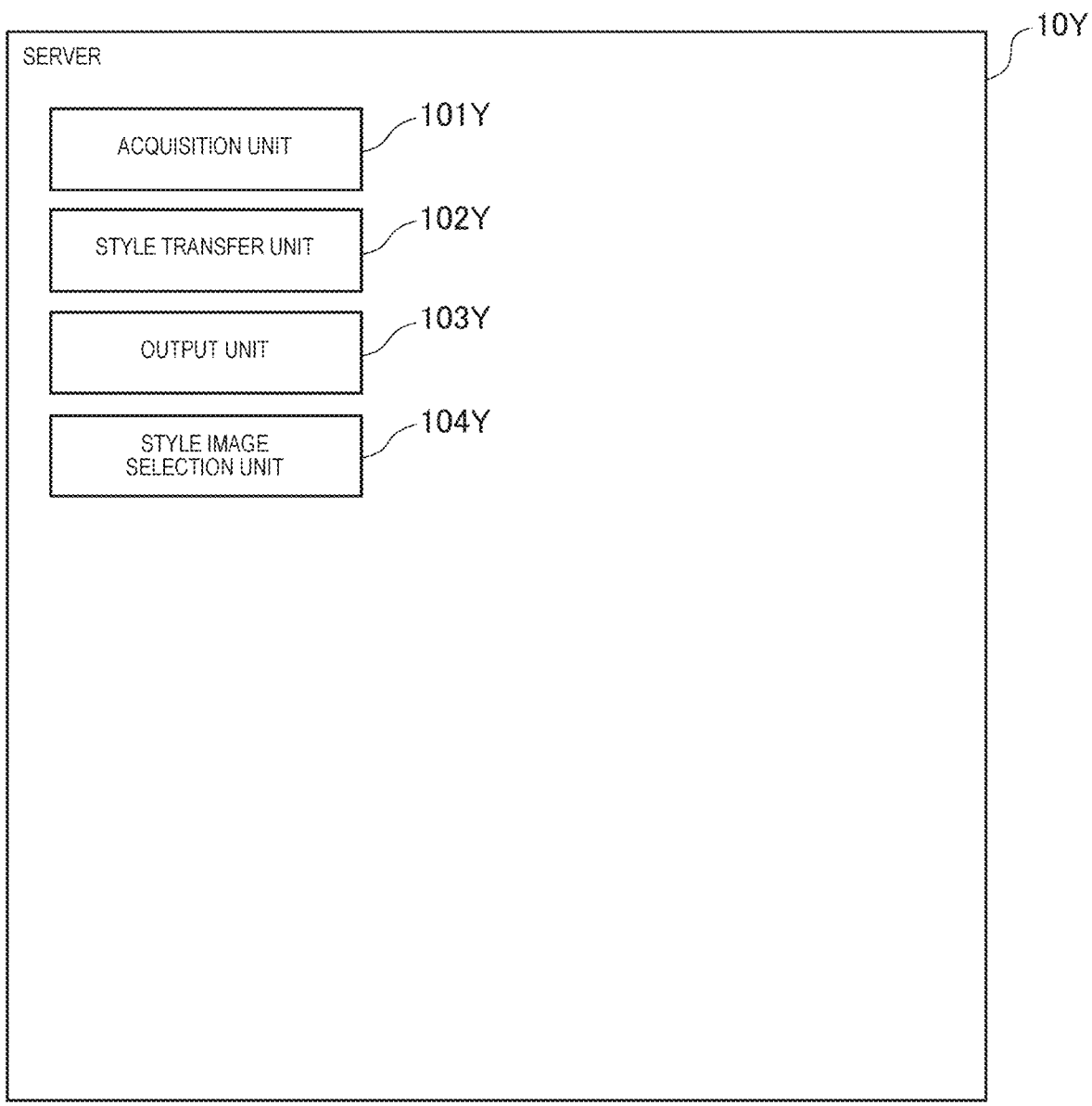
FIG. 10 is a block diagram illustrating a configuration of the server according to at least one embodiment of the present disclosure.

FIG. 10 is a block diagram illustrating a configuration of the server according to at least one embodiment of the present disclosure. A server 10Y that is an example of the configuration of the server 10 includes at least an acquisition unit 101Y, a style transfer unit 102Y, an output unit 103Y, and a style image selection unit 104Y. The processor included in the server 10Y functionally implements the acquisition unit 101Y, the style transfer unit 102Y, the output unit 103Y, and the style image selection unit 104Y by referring to the style transfer program held in the storage apparatus and executing the program.

The acquisition unit 101Y has a function of acquiring the buffer data from the buffer used for rendering. The style transfer unit 102Y has a function of applying the style transfer based on one or more style images to the acquired buffer data. The output unit 103Y has a function of outputting data after the style transfer is applied. The style image selection unit 104Y has a function of selecting the one or more style images based on a predetermined condition.

Figure 11:
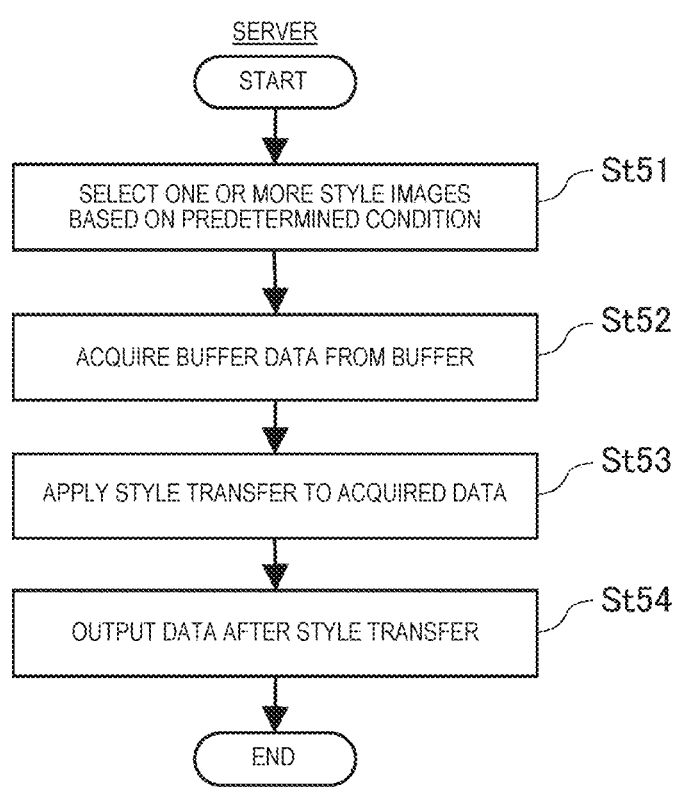
FIG. 11 is a flowchart illustrating an example of the style transfer program process according to at least one embodiment of the present disclosure.

Next, a program execution process in the fifth embodiment of the present disclosure will be described. FIG. 11 is a flowchart illustrating an example of the style transfer program process according to at least one embodiment of the present disclosure.

The style image selection unit 104Y selects one or more style images based on the predetermined condition (St51). The acquisition unit 101Y acquires the buffer data from the buffer used for rendering (St52). The style transfer unit 102Y applies the style transfer based on one or more style images selected in step St51 to the acquired buffer data (St53). The output unit 103Y outputs the data after the style transfer is applied (St54).

The predetermined condition may be various conditions in the video game of which the progress is controlled by the server 10Y. For example, examples of the predetermined condition include emotions of a character appearing in the video game in progress, a type of skill or magic used by the character, and a state change of the character such as buffing, debuffing, and leveling up. The character may be a player character (PC) or a non-player character (NPC). The character may be an allied character or an enemy character.

The predetermined condition may be a condition related to an object other than the character in the video game in progress. Examples of the object include a building or an animate object arranged on the map of the video game and an item appearing in the progress of the video game. Various conditions such as whether or not the object appears, how many times the object appears, whether or not the object is, for example, destroyed and disappears from the map are considered as the predetermined condition.

The predetermined condition may be a condition related to meta-information or system information in the video game in progress. Examples of the condition related to the meta-information in the video game in progress include a change in stage on which the player character is present in the game (for example, movement of the stage to a future city). Examples of the condition related to the system information in the video game in progress include a play time period of the video game by the user.

The predetermined condition is not limited to the above and may be other various conditions.

A style means, for example, a mode or a type in construction, art, music, or the like. For example, the style may mean a painting style such as Gogh style or Picasso style. The style may mean a format (for example, a color, a predetermined design, or a pattern) of an image.

The buffer used for rendering means, for example, a buffer used by a rendering engine having a function of rendering a three-dimensional CG image.

The buffer used for rendering may be the 3D buffer. The 3D buffer used for rendering means, for example, a buffer that stores data capable of representing a three-dimensional space.

The buffer used for rendering may be the intermediate buffer. The intermediate buffer used for rendering is a buffer used in the middle of the rendering process. Examples of the intermediate buffer include the RGB buffer, the BaseColor buffer, the Metallic buffer, the Specular buffer, the Roughness buffer, and the Normal buffer. These buffers are buffers arranged before the final buffer in which the CG image finally output is stored, and are buffers different from the final buffer. The intermediate buffer used for rendering is not limited to the illustrated buffers.

The style transfer unit 102Y may use a neural network for the style transfer. For example, related technologies include Vincent Dumoulin, et. al, "A LEARNED REPRESENTATION FOR ARTISTIC STYLE". The output image to which the style transfer is applied is obtained by causing the style transfer unit 102Y to input the input image of the predetermined size into the neural network.

Figure 12:
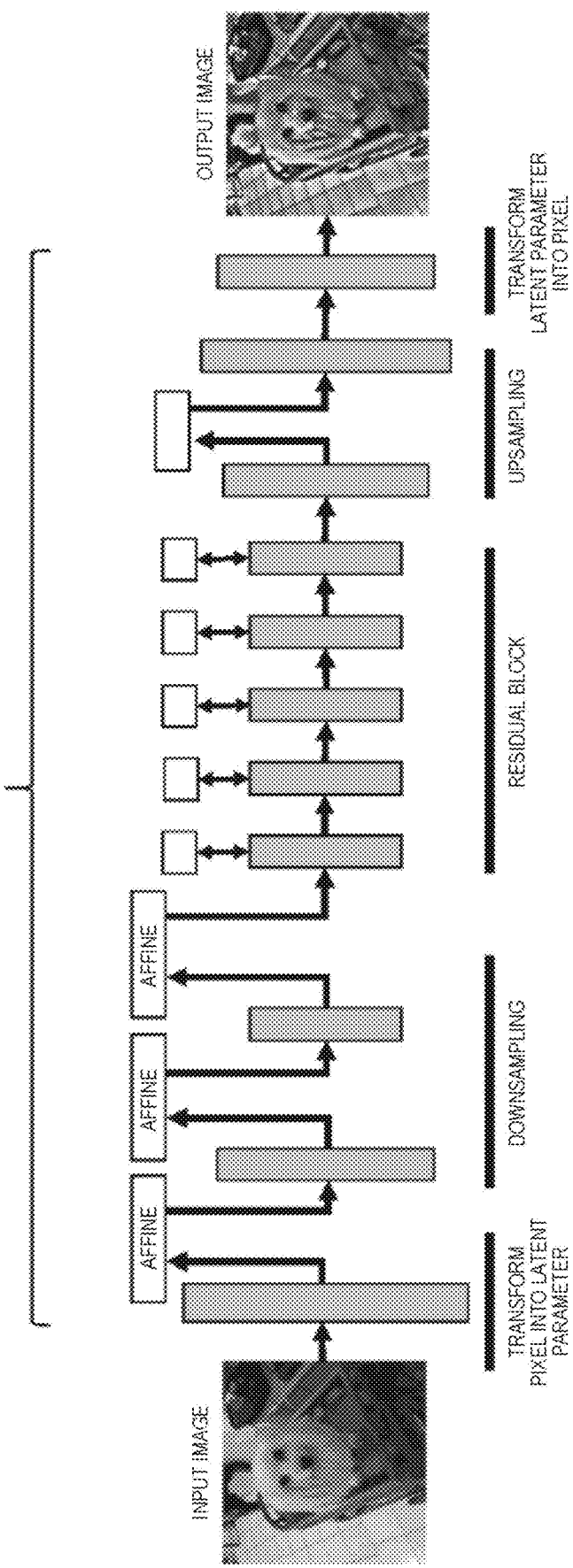
FIG. 12 is a conceptual diagram illustrating a structure example of a neural network used for style transfer according to at least one embodiment of the present disclosure.

FIG. 12 is a conceptual diagram illustrating a structure example of a neural network N1 used for the style transfer according to at least one embodiment of the present disclosure. The neural network N1 includes a first transformation layer for transforming a pixel group based on the input image into a latent parameter, one or more layers for performing downsampling using convolution or the like, a plurality of residual block layers, a layer for performing upsampling, and a second transformation layer for transforming a latent parameter into a pixel group. The output image is obtained based on the pixel group that is an output of the second transformation layer.

In the neural network N1, a fully connected layer is arranged between the first transformation layer and the layer for performing the downsampling, between a plurality of convolutional layers included in the layer for performing the downsampling, and the like. The fully connected layer is referred to as the affine layer.

The style transfer unit 102Y inputs the buffer data acquired by the acquisition unit 101Y into the first transformation layer of the neural network NIL Accordingly, the data after application of the style transfer is output from the second transformation layer of the neural network N1.

An output destination of the data after application of the style transfer for the output unit 103Y may be a buffer different from the buffer from which the acquisition unit 101Y acquires the buffer data. More specifically, in a case where the buffer from which the acquisition unit 101Y acquires the buffer data is the first buffer, the output destination of the data after application of the style transfer may be the second buffer different from the first buffer. The second buffer may be a buffer used after the first buffer in the rendering process.

Besides, the output destination of the data after application of the style transfer for the output unit 103Y may be an output apparatus included in the server 10Y or an external apparatus seen from the server 10Y.

As one aspect of the fifth embodiment, the style transfer can be applied in units of buffers used for rendering. Accordingly, the representational power of the image provided to the user can be increased.

As one aspect of the fifth embodiment, by incorporating the acquisition unit 101Y, the style transfer unit 102Y, and the like into a game engine capable of operating the buffer, the style transfer can be performed based on richer information than a photo or the like used in the related art. For example, the game engine can recognize a specific object displayed on the game screen and apply the style transfer to only a buffer corresponding to the specific object.

As one aspect of the fifth embodiment, in a case where a configuration of applying the style transfer to the buffer is used, a type of applied style transfer can be appropriately selected for each buffer. Thus, various CG representations can be performed. For example, applying the style transfer of transforming the style into Gogh style to the first buffer and applying the style transfer of transforming the style to Gauguin style to the second buffer can be newly performed.

As one aspect of the fifth embodiment, by applying the style transfer to the buffer used for rendering, the style of the game image can be changed in real time.

As one aspect of the fifth embodiment, the style transfer can be applied to the 3D buffer used for rendering. Accordingly, the style of the entire 3D CG map displayed to the user can be transformed based on various conditions and the like in the game.

As one aspect of the fifth embodiment, by applying the style transfer to the data stored in the intermediate buffer used for rendering, the data to which the style transfer is applied can be obtained as an output of the intermediate buffer. The style transfer can be applied to a part of data such as color information or light reflection information cut out from various viewpoints in the middle of rendering. Thus, precise style transformation or style control can be performed. In addition, by generating the final image using the data to which the style transfer is applied, the representational power of the final image provided to the user can be further increased.

As one aspect of the fifth embodiment, the style transfer can be differently applied to the buffer in accordance with various conditions related to the video game in progress or the like. For example, in a case where the buffer is a buffer corresponding to an object appearing in the video game, the style transfer can be differently applied for each object. In a case where the buffer is the 3D buffer, for example, touching of the entire map can be changed based on the emotions (smiling, crying, being upset, and the like) of the character appearing in the game. Touching of the entire map can also be changed based on the type of skill or magic used by the character in the game. Touching of the entire map may also be changed based on the state change of the character. In a case where the buffer is the intermediate buffer, a color controlled by the intermediate buffer (BaseColor buffer), whether or not to set a surface to be metallic (Metallic buffer), a light reflection degree (Specular buffer), roughness (Roughness buffer), and the like can be individually transformed based on a target style image depending on the emotions, the type of magic, the state change, and the like of the character.

Sixth Embodiment

A summary of a sixth embodiment of the present disclosure will be described. Hereinafter, a style transfer program executed in a server will be illustratively described as the sixth embodiment.

Figure 13:
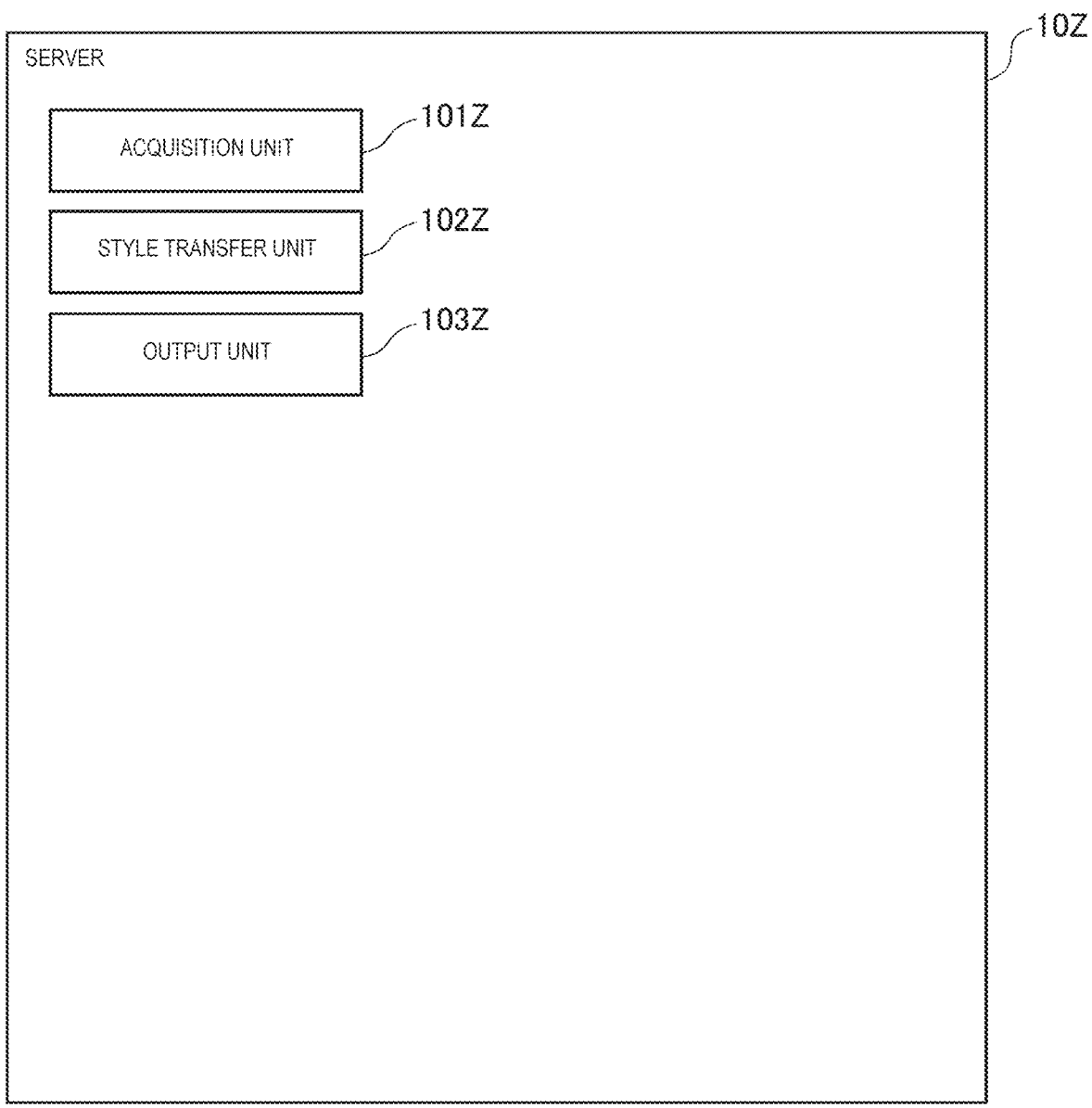
FIG. 13 is a block diagram illustrating a configuration of the server according to at least one embodiment of the present disclosure.

FIG. 13 is a block diagram illustrating a configuration of the server according to at least one embodiment of the present disclosure. A server 10Z that is an example of the configuration of the server 10 includes at least an acquisition unit 101Z, a style transfer unit 102Z, and an output unit 103Z. The processor included in the server 10Z functionally implements the acquisition unit 101Z, the style transfer unit 102Z, and the output unit 103Z by referring to the style transfer program held in the storage apparatus and executing the program.

The acquisition unit 101Z has a function of acquiring the buffer data from the buffer used for rendering. The style transfer unit 102Z has a function of applying the style transfer based on a plurality of style images to the buffer data. The output unit 103Z has a function of outputting data after the style transfer is applied.

Figure 14:
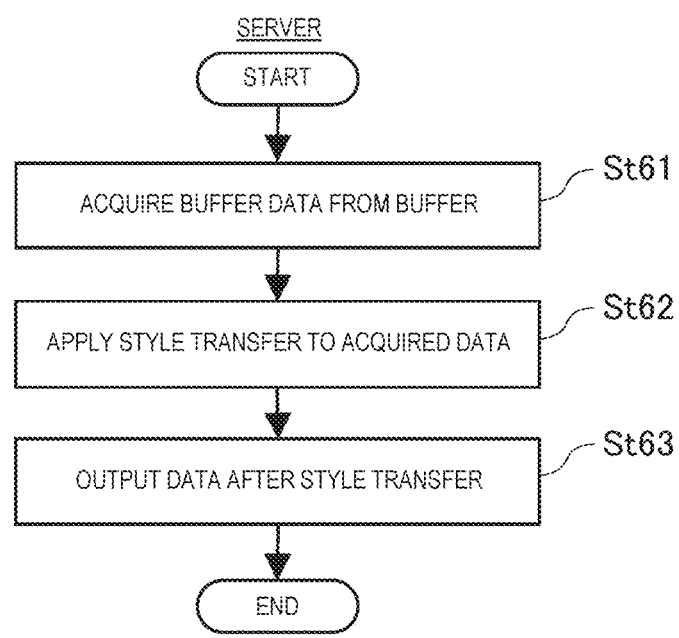
FIG. 14 is a flowchart illustrating an example of the style transfer program process according to at least one embodiment of the present disclosure.

Next, a program execution process in the sixth embodiment of the present disclosure will be described. FIG. 14 is a flowchart illustrating an example of the style transfer program process according to at least one embodiment of the present disclosure.

The acquisition unit 101Z acquires the buffer data from the buffer used for rendering (St61). The style transfer unit 102Z applies the style transfer based on the plurality of style images to the acquired buffer data (St62). The output unit 103Z outputs the data after the style transfer is applied (St63).

A style means, for example, a mode or a type in construction, art, music, or the like. For example, the style may mean a painting style such as Gogh style or Picasso style. The style may mean a format (for example, a color, a predetermined design, or a pattern) of an image.

The buffer used for rendering means, for example, a buffer used by a rendering engine having a function of rendering a three-dimensional CG image.

The buffer used for rendering may be the 3D buffer. The 3D buffer used for rendering means, for example, a buffer that stores data capable of representing a three-dimensional space.

The buffer used for rendering may be the intermediate buffer. The intermediate buffer used for rendering is a buffer used in the middle of the rendering process. Examples of the intermediate buffer include the RGB buffer, the BaseColor buffer, the Metallic buffer, the Specular buffer, the Roughness buffer, and the Normal buffer. These buffers are buffers arranged before the final buffer in which the CG image finally output is stored, and are buffers different from the final buffer. The intermediate buffer used for rendering is not limited to the illustrated buffers.

The acquisition unit 101Z may acquire data of a target for applying the style transfer from a location other than the buffer used for rendering. For example, the acquisition unit 101Z may acquire data of the target for applying the style transfer from the memory 12 or an external apparatus or the like seen from the server 10Z. The acquired data is typically image data but may be data of other types (for example, voice data).

Application of the style transfer (step St62) by the style transfer unit 102Z is performed by inputting the buffer data into the learned neural network that is obtained by mixing the parameters based on the plurality of style images into the predetermined layer of the neural network and performing the optimization process based on the optimization function defined based on the plurality of style images. Hereinafter; the learned neural network will be described.

Figure 15:
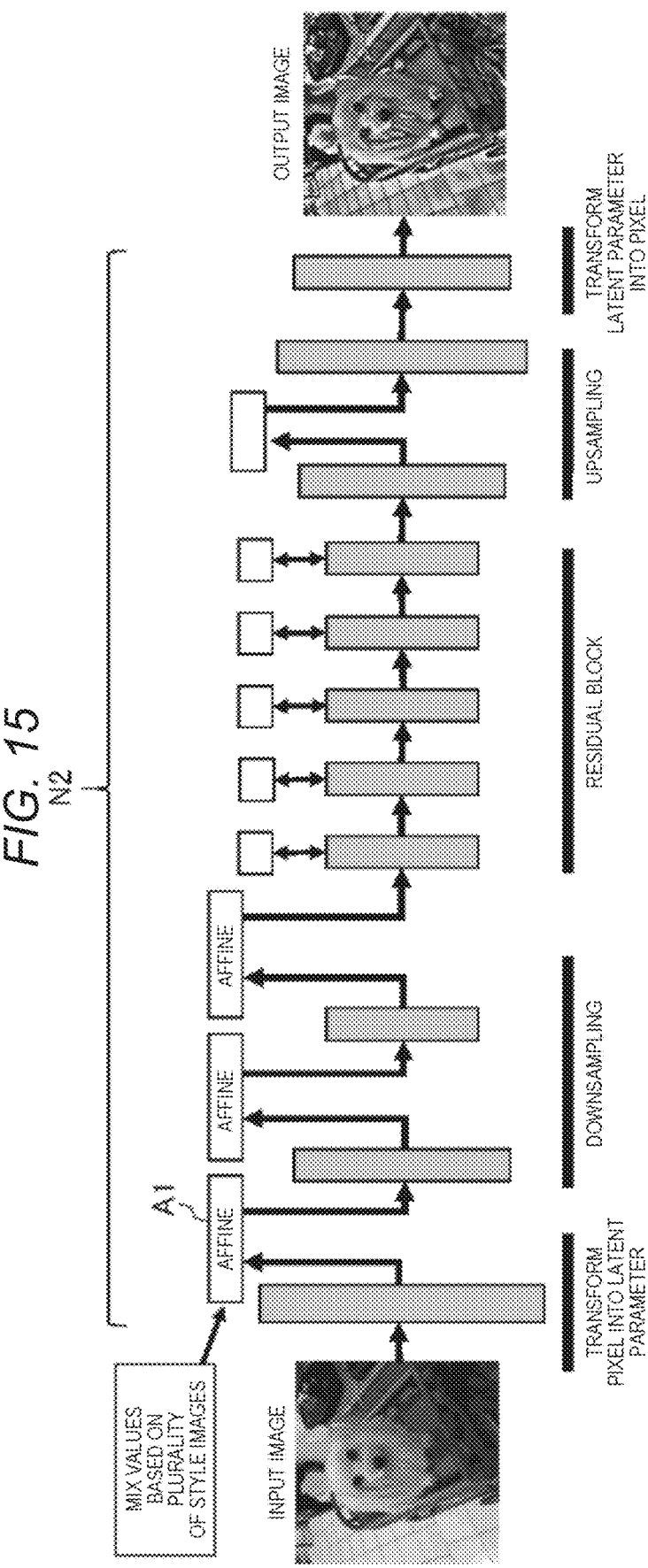
FIG. 15 is a conceptual diagram illustrating a structure example of the neural network used for the style transfer according to at least one embodiment of the present disclosure.

FIG. 15 is a conceptual diagram illustrating a structure example of a neural network N2 used for the style transfer according to at least one embodiment of the present disclosure. The neural network N2 includes the first transformation layer for transforming a pixel group based on the input image into a latent parameter, one or more layers for performing downsampling using convolution or the like, a plurality of residual block layers, the layer for performing upsampling, and the second transformation layer for transforming a latent parameter into a pixel group. The output image is obtained based on the pixel group that is an output of the second transformation layer.

In the neural network N2, a fully connected layer is arranged between the first transformation layer and the layer for performing the downsampling, between a plurality of convolutional layers included in the layer for performing the downsampling, and the like. The fully connected layer is referred to as the affine layer.

The parameters based on the plurality of style images are mixed into an affine layer A1 of the neural network N2. More specific description follows below.

In a case where parameters of affine transformation are denoted by a and b, and a latent variable of a pixel of an image is denoted by x, the affine layer A1 of the neural network N2 is a layer for performing a process of transforming the latent variable x of an output of a convolutional layer into x*a+b.

Here, in a case where any style 1 and style 2 are blended, the process performed in the affine layer A1 under control of the style transfer unit 102Z is as follows. Affine transformation parameters derived from a style image related to the style 1 are denoted by $a_1$ and $b_1$. Affine transformation parameters derived from a style image related to the style 2 are denoted by $a_2$ and $b_2$. The affine transformation parameters in a case of blending the style 1 and the style 2 are a=$(a_1+a_2)/2$ and b=$(b_1 b_2)/2$. The style 1 and the style 2 can be blended by calculating x*a+b in the affine layer A1. The above illustrates a calculation expression in a case of equally (50% for each) blending the style 1 and the style 2. Based on the ordinary knowledge of those skilled in the art, blending may be performed after performing weighting in order to obtain a ratio of different degrees of effect based on each style such that the style 1 is 80% and the style 2 is 20%.

The number of styles to be blended may be greater than or equal to three. In a case where n denotes a natural number greater than or equal to three, for example, the affine transformation parameters in a case of blending n styles may be a=$(a_1+a_2 \ldots +a_n)/n$ and b=$(b_1+b_2 \ldots +b_n)/n$. The point of performing blending after performing weighting in order to obtain a ratio of different degrees of effect based on each style is the same as in a case where the number of styles is two.

Transformation parameters $a_k$ and $b_k$ (k is any natural number of 1 to n) for a plurality of styles may be stored in the memory 12 or the like of the server 10Z. In addition, for example, the transformation parameters for the plurality of styles may be stored in the memory 12, the storage apparatus 13, or the like in a vector format such as $(a_1, a_2, \ldots a_n)$ and $(b_1, b_2, \ldots b_n)$. In a case of performing weighting in order to obtain a ratio of different degrees of effect based on each style, a value indicating a weight corresponding to each style may be stored in the memory 12, the storage apparatus 13, or the like.

Next, the optimization function for performing machine learning for the neural network N2 will be described. The optimization function is referred to as a loss function. A learned neural network N2 is obtained by performing the optimization process on the neural network N2 based on the optimization function defined based on the plurality of style images. For convenience of description, the same reference sign N2 is used for each of the neural networks before and after learning.

For example, in the related technology, an optimization function defined as follows is used.

Style Optimization Function:

$$\mathcal{L}_s(p) = \sum_{i \in S} \frac{1}{U_i} \|G(\phi_i(p)) - G(\phi_i(s))\|_F^2$$

Content Optimization Function:

$$\mathcal{L}_c(p) = \sum_{j \in C} \frac{1}{U_j} \|\phi_j(p) - \phi_j(c)\|_2^2$$

In the optimization function, p denotes a generated image. The generated image corresponds to an output image of the neural network used for machine learning. For example, a style image such as an abstract painting is denoted by s (lower case s). The total number of units of an i-th layer is denoted by $U_i$. The total number of units of a j-th layer is denoted by $U_j$. The Gram matrix is denoted by G. An output of an i-th activation function of VGG-16 architecture is denoted by $\phi_i$. A layer group of VGG-16 for calculating optimization of the style is denoted by S (upper case S). A content image is denoted by c (lower case c). A layer group of VGG-16 for calculating the content optimization function is denoted by C (upper case C), and an index of a layer included in the layer group is denoted by j. The character F attached to absolute value symbols means the Frobenius norm An output image that is transformed to approximate the style indicated by the style image is output from the neural network by performing machine learning on the neural network for minimizing a value of the optimization function defined by the style optimization function and the content optimization function, and inputting the input image into the neural network after learning.

In the optimization process using the optimization function, in a case of performing the style transfer by blending a plurality of styles, there is room for improvement in the result of blending.

Therefore, in the sixth embodiment of the present disclosure, the optimization process is performed based on the optimization function defined based on the plurality of style images. Accordingly, optimization based on the plurality of style images can be performed. Consequently, an output image in which the plurality of styles are harmoniously blended with respect to the input image can be obtained.

More specifically, the optimization process may include a first optimization process of performing the optimization process using a first optimization function defined based on any two style images selected from the plurality of style images and a second optimization process of performing the optimization process using a second optimization function defined based on one style image of the plurality of style images. Accordingly, in a case where the number of styles desired to be blended is greater than or equal to three, suitable optimization can be performed. Consequently, an output image in which the plurality of styles are more harmoniously blended with respect to the input image can be obtained.

Next, the first optimization function and the second optimization function will be described. As one aspect of the sixth embodiment, the first optimization function may be defined by Equation (1) below.

$$\mathcal{L}_{q,r}(p) = \sum_{i \in S} \left\| \frac{G(\phi_i(p))}{N_{i,r} * N_{i,c}} - \frac{1}{2}\left[\frac{G(\phi_i(q))}{N_{i,r} * N_{i,c}} + \frac{G(\phi_i(r))}{N_{i,r} * N_{i,c}}\right] \right\|_F^2 ; q \neq r$$

$$\forall q \forall r, q \in \hat{S}, r \in \hat{S} \qquad (1)$$

As one aspect of the sixth embodiment, the second optimization function may be defined by Equation (2) below.

$$\mathcal{L}_s(p) = \sum_{i \in S} \left\| \frac{G(\phi_i(p))}{N_{i,r} * N_{i,c}} - \frac{G(\phi_i(s))}{N_{i,r} * N_{i,c}} \right\|_F^2 \qquad (2)$$

In the above equation,
$\hat{S}$
is a style image group consisting of the plurality of style images, and q and r denote any style images included in the style image group. However, q and r are style images different from each other. The number of rows of a $\phi_i$ feature map is denoted by $N_{i,r}$. The number of columns of the $\phi_i$ feature map is denoted by $N_{i,c}$. In addition, p, s (lower case s), G, $\phi_i$, S, c (lower case c), and F are the same as in the related technology.

When the generated image is denoted by p, and any two style images selected from the plurality of style images are denoted by q and r, the first optimization function is a function of adding norms between a value obtained by performing a predetermined calculation on the image p and an average value of values obtained by performing the predetermined calculation on each of the style images q and r, Equation (1) illustrates a case where $$\frac{G \circ \phi_i}{N_{i,r} * N_{i,c}}$$

is the predetermined calculation. The predetermined calculation may be a calculation other than the above.

When the generated image is denoted by p, and the style image is denoted by s, the second optimization function is a function of adding norms between a value obtained by performing a predetermined calculation on the image p and a value obtained by performing the predetermined calculation on the style image s. Equation (2) illustrates a case where $$\frac{G \circ \phi_i}{N_{i,r} * N_{i,c}}$$

is the predetermined calculation. The predetermined calculation may be a calculation other than the above.

Next, an example of the optimization process using the first optimization function and the second optimization function will be described.

FIG. 16 is a flowchart illustrating a process example of the optimization process according to at least one embodiment of the present disclosure. A process example in a case where the first optimization function is the function defined by Equation (1), and the second optimization function is the function defined by Equation (2) will be described.

A process entity of the optimization process is a processor included in an apparatus. The apparatus (hereinafter, an apparatus A) including the processor may be the server 10Z. In this case, the processor 11 illustrated in FIG. 1 is the process entity. The apparatus A including the processor may be other apparatuses (for example, the user terminal 20 or another server) other than the server 102.

The number of styles to be blended is denoted by n. The processor selects any two style images q and r from n style images included in the style image group (St71).

The processor performs optimization for minimizing a value of the first optimization function for the selected style images q and r (St72). For the generated image p, the processor acquires the output image of the neural network as the image p. The neural network may be implemented in the apparatus A or may be implemented in other apparatuses other than the apparatus A.

The processor determines whether or not optimization has been performed for all patterns of $_nC_2$ (St73). That is, the processor determines whether or not all patterns have been processed for selection of any two style images q and r from n style images. In a case where optimization has been performed for all patterns of $_nC_2$ (St73: YES), the process transitions to step St74. In a case where optimization has not been performed for all patterns of $_nC_2$ (St73: NO), the process returns to step St71, and the processor selects the subsequent combination of two style images q and r.

The processor selects one style image s from n style images included in the style image group (St74).

The processor performs optimization for minimizing a value of the second optimization function for the selected style image s (St75). For the generated image p, the processor acquires the output image of the neural network as the image p. The neural network may be implemented in the apparatus A or may be implemented in other apparatuses other than the apparatus A.

The processor determines whether or not optimization has been performed for all patterns of $_nC_1$ (St76). That is, the processor determines whether or not all patterns have been processed for selection of any style image s from n style images. In a case where optimization has been performed for all patterns of $_nC_1$ (St76: YES), the optimization process illustrated in FIG. 16 is finished. In a case where optimization has not been performed for all patterns of $_nC_1$ (St76: NO), the process returns to step St74, and the processor selects the subsequent one style image s.

For example, the style transfer unit 102Z inputs the buffer data acquired by the acquisition unit 1012 into the first transformation layer of the learned neural network N2 optimized as described above. Accordingly, data after application of the style transfer in which n style images are harmoniously blended is output from the second transformation layer of the neural network N2.

In a case of image data that is output based on the optimization process in the related technology, the blending result of the plurality of styles is blurred, and only the color is averaged. Meanwhile, in a case of the output image that is output based on the optimization process according to the sixth embodiment of the present disclosure, the color and the patterns are harmoniously blended.

An output destination of the data after application of the style transfer for the output unit 103Z may be a buffer different from the buffer from which the acquisition unit 1012 acquires the buffer data. More specifically, in a case where the buffer from which the acquisition unit 1012 acquires the buffer data is the first buffer, the output destination of the data after application of the style transfer may be the second buffer different from the first buffer. The second buffer may be a buffer used after the first buffer in the rendering process.

Besides, the output destination of the data after application of the style transfer for the output unit 103Z may be an output apparatus included in the server 10Z or an external apparatus seen from the server 10Z.

As one aspect of the sixth embodiment, in the style transfer based on the plurality of style images, by performing the optimization process based on the optimization function defined based on the plurality of style images, quality of blending of the styles in the output image can be improved.

As one aspect of the sixth embodiment, by optimizing any two style images and then, optimizing each style image, the quality of blending of the styles in the output image can be further improved.

As one aspect of the sixth embodiment, by calculating an average of values originating from two style images and then, calculating norms between the average and the generated image, the two style images can be optimized in a well-balanced manner.

As one aspect of the sixth embodiment, by using the function defined by Equation (1) as the first optimization function, an output image in which the color and the patterns are harmoniously blended in accordance with the plurality of style images can be obtained.

As one aspect of the sixth embodiment, by selecting and optimizing two style images and then, optimizing each style image, each style image can be optimized in a well-balanced manner.

As one aspect of the sixth embodiment, by using the function defined by Equation (2) as the second optimization function, an output image in which the color and the patterns are harmoniously blended in accordance with each style image can be obtained.

As described above, each embodiment of the present application solves one or two or more deficiencies. Effects of each embodiment are non-limiting effects or an example of effects.

In each embodiment, the user terminal 20 and the server 10 execute the above various processes in accordance with various control programs (for example, the style transfer program) stored in the respective storage apparatuses thereof. In addition, other computers not limited to the user terminal 20 and the server 10 may execute the above various processes in accordance with various control programs (for example, the style transfer program) stored in the respective storage apparatuses thereof.

In addition, the configuration of the video game processing system 100 is not limited to the configurations described as an example of each embodiment. For example, a part or all of the processes described as a process executed by the user terminal may be configured to be executed by the server 10. A part or all of the processes described as a process executed by the server 10 may be configured to be executed by the user terminal 20. In addition, a part or the entire storage unit (storage apparatus) included in the server 10 may be configured to be included in the user terminal 20. That is, a part or all of the functions included in any one of the user terminal and the server in the video game processing system 100 may be configured to be included in the other.

In addition, the program may be caused to implement a part or all of the functions described as an example of each embodiment in a single apparatus not including the communication network.

APPENDIX

The above description of the embodiments is disclosed in order for those of ordinary knowledge in the field of the invention to embody at least the following invention.

[1] A style transfer program causing a server to implement an acquisition function of acquiring buffer data from a buffer used for rendering, a style transfer function of applying style transfer based on one or more style images to the buffer data, and an output function of outputting data after the style transfer is applied.

[2] The style transfer program according to [1], in which the buffer is a 3D buffer.

[3] The style transfer program according to [1], in which the buffer is an intermediate buffer.

[4] The style transfer program according to any one of [1] to [3], in which the style transfer program causes the server to implement a style image selection function of selecting the one or more style images based on a predetermined condition.

[5] The style transfer program according to according to any one of [1] to [4], in which in the style transfer function, a function of applying the style transfer based on a plurality of style images to the buffer data is implemented, and application of the style transfer is performed by inputting the buffer data into a learned neural network that is obtained by mixing parameters based on the plurality of style images into a predetermined layer of a neural network and performing an optimization process based on an optimization function defined based on the plurality of style images.

[6] The style transfer program according to [5], in which the optimization process includes a first optimization process of performing the optimization process using a first optimization function defined based on any two style images selected from the plurality of style images, and a second optimization process of performing the optimization process using a second optimization function defined based on one style image of the plurality of style images.

[7] The style transfer program according to [6], in which the first optimization function is, when a generated image is denoted by p, and the any two style images selected from the plurality of style images are denoted by q and r, a function of adding norms between a value obtained by performing a predetermined calculation on the image p and an average value of values obtained by performing the predetermined calculation on each of the style images q and r.

[8] The style transfer program according to [7], in which the first optimization function is $$\mathcal{L}_{q,r}(p) = \sum_{i \in S} \left\| \frac{G(\phi_i(p))}{N_{i,r} * N_{i,c}} - \frac{1}{2} \left[ \frac{G(\phi_i(q))}{N_{i,r} * N_{i,c}} + \frac{G(\phi_i(r))}{N_{i,r} * N_{i,c}} \right] \right\|_F^2 ; q \neq r$$

$$\forall q \forall r, q \in \hat{S}, r \in \hat{S}$$

[9] The style transfer program according to any one of [6] to [8], in which the second optimization function is, when a generated image is denoted by p, and a style image is denoted by s, a function of adding norms between a value obtained by performing a predetermined calculation on the image p and a value obtained by performing the predetermined calculation on the style image s.

[10] The style transfer program according to [9], in which the second optimization function is $$\mathcal{L}_s(p) = \sum_{i \in S} \left\| \frac{G(\phi_i(p))}{N_{i,r} * N_{i,c}} - \frac{G(\phi_i(s))}{N_{i,r} * N_{i,c}} \right\|_F^2$$

[11] A server on which the style transfer program according to any one of [1] to [10] is installed.
[12] A computer on which the style transfer program according to any one of [1] to [10] is installed.
[13] A style transfer method by a computer, the style transfer method including an acquisition process of acquiring buffer data from a buffer used for rendering, a style transfer process of applying style transfer based on one or more style images to the buffer data, and an output process of outputting data after the style transfer is applied.

INDUSTRIAL APPLICABILITY

One embodiment of the present invention is useful as a non-transitory computer readable medium including a style transfer program, and a style transfer method that increases representational power of an image provided to a user.

What is claimed is:

1. A non-transitory computer readable medium comprising a style transfer program that, when executed, causes a server to perform:
receiving first image data from a buffer;
applying style transfer to the first image data based on one or more style images to generate second image data; and
providing the second image data,
wherein the program causes a server to further perform:
obtaining a neural network comprising:
mixing parameters based on a plurality of style images into a predetermined layer of a neural network;
optimizing the neural network based on the plurality of style images to provide a learned neural network; and
providing the buffer data into a learned neural network,
wherein applying in the style transfer function comprises:
providing the first image data into the learned neural network; and
applying the style transfer based on the plurality of style images to the first image data,
wherein optimizing comprises:
optimizing based on two style images selected from the plurality of style images; and
optimizing based on one style image of the plurality of style images,
wherein optimizing based on the two style images selected from the plurality of style images comprises:
obtaining a first value by performing a predetermined calculation on a generated image denoted by p;
obtaining second and third values by performing the predetermined calculation on the two style images denoted by q and r;
obtaining an average value of the second and third values; and
adding norms between the first value and the average value, and
wherein a function optimizing based on the two style images is represented by an equation:

$$\mathcal{L}_{q,r}(p) = \sum_{i \in S} \left\| \frac{G(\phi_i(p))}{N_{i,r} * N_{i,c}} - \frac{1}{2}\left[\frac{G(\phi_i(q))}{N_{i,r} * N_{i,c}} + \frac{G(\phi_i(r))}{N_{i,r} * N_{i,c}}\right] \right\|_F^2 ; q \neq r$$

$$\forall q \forall r, q \in \hat{S}, r \in \hat{S}.$$

2. The non-transitory computer readable medium according to claim 1, wherein the first image data is a 3D image data.

3. A non-transitory computer readable medium comprising a style transfer program that, when executed, causes a server to perform:
receiving first image data from a buffer;
applying style transfer to the first image data based on one or more style images to generate second image data; and
providing the second image data,
wherein the program causes a server to further perform:
obtaining a neural network, comprising:
mixing parameters based on a plurality of style images into a predetermined layer of a neural network;
optimizing the neural network based on the plurality of style images to provide a learned neural network; and
providing the buffer data into a learned neural network,
wherein applying in the style transfer function comprises:
providing the first image data into the learned neural network; and
applying the style transfer based on the plurality of style images to the first image data,
wherein optimizing comprises:
optimizing based on two style images selected from the plurality of style images; and
optimizing based on one style image of the plurality of style images,
wherein optimizing based on the one style image of the plurality of style images comprises:
obtaining a first value by performing a predetermined calculation on a generated image denoted by p;
obtaining a second value by performing the predetermined calculation on the style image denoted by s; and
adding norms between the first value and the second value, and
wherein a function optimizing based on the one style image of the plurality of style images is represented by an equation:

$$\mathcal{L}_s(p) = \sum_{i \in S} \left\| \frac{G(\phi_i(p))}{N_{i,r} * N_{i,c}} - \frac{G(\phi_i(s))}{N_{i,r} * N_{i,c}} \right\|_F^2.$$

4. The non-transitory computer readable medium according to claim 3, wherein the first image data is a 3D image data.

* * * * *